United States Patent Office 3,511,831
Patented May 12, 1970

3,511,831
THIAZINOBENZOTHIAZINE DERIVATIVES
Joseph E. Dunbar and Betty H. Tarnowski, Midland, Mich., assignors to The Dow Chemical Company, Midland, Mich., a corporation of Delaware
No Drawing. Filed July 19, 1968, Ser. No. 745,972
Int. Cl. C07d 93/12; A01n 9/12, 9/14
U.S. Cl. 260—240
14 Claims

ABSTRACT OF THE DISCLOSURE 2,3,5,6 - tetrahydro - (1,4) -thiazino - (4,3,2 - de) (1,4) - benzothiazine - 9 - carboxaldehyde and the 2,3,5,6-tetrahydro - 8 - loweralkyl - (1,4) - thiazino - (4,3,2-de) (1,4) - benzothiazine - 9 - carboxaldehydes and their oxides and derivatives, said derivatives being those wherein the oxygen atom of the carboxaldehyde moiety is replaced with a nitrogen atom such as to form the corresponding oximes, semicarbazones, thiosemicarbazones or hydrazones. These compounds are useful as pesticides.

The present invention is concerned with novel and useful thiazinobenzothiazine derivatives, particularly the 2,3,5,6 - tetrahydro - (1,4) - thiazino - (4,3,2-de)(1,4)-benzothiazine - 9 - carboxaldehydes which can be represented by the following Formula I:

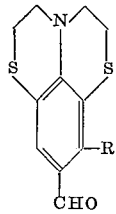

(I)

and their oxides which can be represented by the following Formula II:

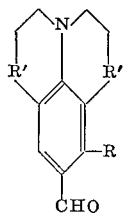

(II)

and their derivatives which can be represented by the following Formula III:

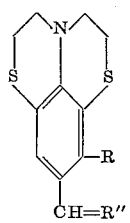

(III)

In these above and succeeding formulas in the present specification, each R represents hydrogen or lower alkyl; one R' represents a sulfinyl (SO) group and the other R' represents a sulfur atom, a sulfinyl (SO) group, or a sulfonyl (SO₂) group; R" represents hydroxyimino (=NOH)

semicarbazono (=NNHCONH₂), thiosemicarbazono (=NNHCSNH₂)

or hydrazono (=NNHR'") in which R'" represents hydrogen, phenyl, nitrophenyl or dinitrophenyl.

Thus included within the scope of the compounds of the present invention as depicted and defined are 2,3,5,6-tetrahydro - (1,4) - thiazino - (4,3,2-de)(1,4) - benzothiazine-9-carboxaldehyde per se as well as its S-oxide, S,S'-dioxide, and S,S,S'-trioxide and the hydroxyimino, semicarbazono, thiosemicarbazono, and hydrazono aldehydic derivatives of 2,3,5,6 - tetrahydro - (1,4) - thiazino-(4,3,2-de)(1,4) - benzothiazine - 9 - carboxaldehyde, each of which compounds can be optionally substituted with a lower alkyl group at position C–8 of the ring.

The term "lower alkyl" as employed in the present specification and claims designates an alkyl group containing 1, to 2, to 3, and up to and including 4 carbon atoms, and 1, and 2, and 3, and 4 carbon atoms. Preferred lower alkyl groups are methyl, ethyl, n-propyl, n-butyl and isobutyl. The term "nitrophenyl" denotes 2-nitrophenyl, 3-nitrophenyl, and 4-nitrophenyl and the term "dinitrophenyl" includes 2,4-dinitrophenyl, 2,6-dinitrophenyl, and the like.

For the sake of simplicity and convenience, the new 2,3,5,6 - tetrahydro - (1,4) - thiazino - (4,3,2-de)(1,4)-benzothiazine-9-carboxaldehydes (I) of the present invention will be referred to as thiazinobenzothiazine carboxaldehydes, their oxides (II) as thiazinobenzothiazine carboxaldehyde oxides, and the aldehydic derivatives (III) of (I) as thiazinobenzothiazine aldehydic derivatives. These described products are crystalline solids which are soluble in many common organic solvents but have limited solubility in water. They are useful as pesticides for the control of various organisms and particularly for the control of any parasite, insect, bacteria, and fungal organisms, including for example ascarids, pinworms, tapeworms, southern arymworms, cockroaches, *Staphylococcus aureus*, *Candida albicans* and *Trichophyton mentagrophytes*.

Representative compounds of the present invention include:

2,3,5,6-tetrahydro-8-(n-propyl)-(1,4)-thiazino-(4,3,2-de)
   (1,4)-benzothiazine-9-carboxaldehyde;
2,3,5,6-tetrahydro-8-(n-butyl)-(1,4)-thiazino-(4,3,2-de)
   (1,4)-benzothiazine-9-carboxaldehyde;
2,3,5,6-tetrahydro-8-isobutyl-(1,4)-thiazino-(4,3,2-de)
   (1,4)-benzothiazine-9-carboxaldehyde;
2,3,5,6-tetrahydro-8-methyl-(1,4)-thiazino-(4,3,2-de)
   (1,4)-benzothiazine-9-carboxaldehyde 1,7-dioxide;
2,3,5,6-tetrahydro-8-(n-propyl)-(1,4)-thiazino-(4,3,2-de)
   (1,4)-benzothiazine-9-carboxaldehyde 1,1,7-trioxide;
2,3,5,6-tetrahydro-8-(n-propyl)-(1,4)-thiazino-(4,3,2-de)
   (1,4)-benzothiazine-9-carboxaldehyde 1,7,7-trioxide;
2,3,5,6-tetrahydro-8-(n-butyl)-(1,4)-thiazino-(4,3,2-de)
   (1,4)-benzothiazine-9-carboxaldehyde 1-oxide;
2,3,5,6-tetrahydro-8-(n-butyl)-(1,4)-thiazino-(4,3,2-de)
   (1,4)-benzothiazine-9-carboxaldehyde 7-oxide;
2,3,5,6-tetrahydro-8-methyl-(1,4)-thiazino-(4,3,2-de)
   (1,4)-benzothiazine-9-carboxaldehyde 1,1,7-trioxide;
2,3,5,6-tetrahydro-8-methyl-(1,4)-thiazino-(4,3,2-de)
   (1,4)-benzothiazine-9-carboxaldehyde 1,7,7-trioxide;
2,3,5,6-tetrahydro-8-isobutyl-(1,4)-thiazino-(4,3,2-de)
   (1,4)-benzothiazine-9-carboxaldehyde 1,7-dioxide;
2,3,5,6-tetrahydro-8-(n-propyl)-(1,4)-thiazino-(4,3,2-de)
   (1,4)-benzothiazine-9-carboxaldehyde oxime;
2,3,5,6-tetrahydro-8-ethyl-(1,4)-thiazino-(4,3,2-de)
   (1,4)-benzothiazine-9-carboxaldehyde semicarbazone;
2,3,5,6-tetrahydro-8-(n-butyl)-(1,4)-thiazino-(4,3,2-de)
   (1,4)-benzothiazine-9-carboxaldehyde semicarbazone;
2,3,5,6-tetrahydro-8-ethyl-(1,4)-thiazino-(4,3,2-de)
   (1,4)-benzothiazine-9-carboxaldehyde thiosemicarbazone;
2,3,5,6-tetrahydro-8-(n-propyl)-(1,4)-thiazino-(4,3,2- de)(1,4)-benzothiazine-9-carboxaldehyde hydrazone;
2,3,5,6-tetrahydro-8-methyl-(1,4)-thiazino-(4,3,2-de)
(1,4)-benzothiazine-9-carboxaldehyde 2,4-dinitrophenylhydrazone; and
2,3,5,6-tetrahydro-8-isobutyl-(1,4)-thiazino-(4,3,2-de)
(1,4)-benzothiazine-9-carboxaldehyde 2-nitro-phenylhydrazone.

The novel 2,3,5,6 - tetrahydro-(1,4)-thiazino-(4,3,2-de) (1,4)-benzothiazine-9-carboxaldehyde and its 8-lower alkyl derivatives are prepared by reacting together phosphorus oxychloride, methylformanilide or dimethylformamide, and a thiazinobenzothiazine of the formula

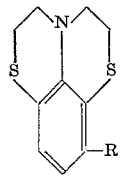

The reactants can be employed in any relative amount; however, the reaction consumes the reactants in the proportion of one mole of methylformanilide or dimethylformamide per mole each of phosphorus oxychloride and thiazinobenzothiazine, and the employment of such proportions or an excess, upwards of two-fold, of each of the phosphorus oxychloride and methylformanilide or dimethylformamide in comparison to the thiazinobenzothiazine can be employed. The reactants can themselves be used as the entire reaction medium in which case, for example, the dimethylformamide conveniently is used in excess. Alternatively, the reaction can be carried out in a liquid reaction medium such as o-dichlorobenzene. The reaction proceeds smoothly at a temperature of from 0° C. or lower to about 100° C. or more and conveniently at temperatures of from 25° C. to 100° C.

In conducting the reaction, the thiazinobenzothiazine, methylformanilide or dimethylformamide, phosphorus oxychloride and liquid reaction medium if employed are mixed together in any convenient fashion. In one manner, the thiazinobenzothiazine is added to a solution of the phorphorus oxychloride dispersed in the methylformanilide or dimethylformamide. This may be done at relatively low temperatures as from about 0° C. to 30° C. The reactants are then maintained at a temperature of from 0° C. to 100° C., preferably, 25° C. to 100° C. for a period of time sufficient to complete the reaction, usually ranging from a few minutes to several hours, and generally with stirring. After the reaction is complete the products are recovered via conventional means such as precipitation, filtration and decantation. Precipitation can be induced by quenching the reaction mixture in water followed by neutralizing the resultant solution with an alkali metal acetate, for example, sodium acetate and thereafter allowing the product to accumulate. Subsequent filtration and recrystallization, if desired, achieves the final separation and purification.

The new thiazinobenzothiazine carboxaldehyde oxides of the present invention are prepared by oxidizing the corresponding thiazinobenzothiazine carboxaldehyde or its 8-lower alkyl derivatives, which compounds correspond to Formula I, with an oxidizing agent, which include, representatively, hydrogen peroxide, peroxymonophthalic acid, peroxymonosulfuric acid, peracetic acid, and perbenzoic acid. The reaction is conveniently performed in liquid reaction medium. Suitable media include acetic acid and trifluoroacetic acid. Hydrogen peroxide, and conveniently a solution thereof with glacial acetic acid, is the oxidizing agent of choice in the production of the oxides of the present invention. The reaction takes place at temperatures of from about 30° C. to about 100° C. In a convenient method, the reaction is carried out at beween 40° C. and 80° C.

These oxidized products represent three oxidative steps or plateaus. Thus, there can be formed the S-oxides, the S,S'-dioxide, and the S,S,S'-trioxide products. In such operations, one molecular proportion of the thiazinobenzothiazine carboxaldehyde is reacted with an amount of oxidizing agent sufficient to supply one, two or three atoms of oxygen depending upon whether it is desired to introduce one, two or three atoms of oxygen in one molecule of thiazinobenzothiazine carboxaldehyde. In carrying out the various oxidation reactions to prepare the compounds of the present invention, it is preferably to employ the oxidizing agent in such amounts as will provide oxygen in the stoichiometric quantities required for the production of the desired oxide product. In some instances, the use of a slight excess of the oxidizing agent is preferred.

In carrying out the reaction, the reactants are contacted in any order or fashion, and preferably in amounts stoichiometric for the preparation of the desired product. The reaction mixture is then maintained at a temperature within the reaction temperature range for a short period of time. Following the reaction period, the thiazinobenzothiazine oxide product can be precipitated by quenching the reaction mixture in ice water and thereafter neutralizing the resulting aqueous mixture which induces precipitation. The product is then separated by conventional procedures such as filtration, decantation and recrystallization. The neutralization which initiates product precipitation is conveniently conducted by the addition of a base, such as an alkali metal hydroxide or ammonium hydroxide.

The various thiazinobenzothiazine aldehydic derivatives of the present invention are prepared by treating a thiazinobenzothiazine carboxaldehyde of Formula I severally with a series of reagents which include (a) hydroxylamine, (b) semicarbazide, (c) thiosemicarbazide, and (d) a hydrazine. With each of these reactions, the appropriate reactants can be employed in any relative amount. The respective reactions consume the reactants in the ratio of one mole of the thiazinobenzothiazine carboxaldehyde starting compound per mole of the (a), (b), (c) or (d) reactants and the employment of such amounts or a slight excess of the latter reactants in comparison to the thiazinobenzothiazine carboxaldehyde is preferred. The reactions proceed at temperatures of from about 20° C. to 100° C. and, conveniently, at the boiling point of the reaction mixture and under reflux. The reaction can be conducted in a lower alkanol as reaction medium such as methanol and ethanol.

In conducting these reactions the reactants and liquid reaction medium, if employed, are mixed and contacted in any convenient order or fashion. Following such contacting, the reaction mixtures are maintained within the given temperature range and conveniently at the boiling point of the reaction mixture and under reflux for a period of time sufficient to assure product formation. After the completion of reaction, the respective products are recovered and separated via conventional procedures such as precipitation, filtration, extraction, decantation and crystallization.

The following examples serve further to typify the nature by which the present invention can be practiced, but, as such, should not be construed as limitative.

EXAMPLE 1

Phosphorus oxychloride (46.0 grams; 0.300 mole) is added dropwise with stirring to 200 milliliters of dimethylformamide, keeping the temperature below 10° C. The reaction mixture is then kept at 5° C. while 61.3 grams (0.293 mole) of 2,3,5,6-tetrahydro - (1,4) - thiazino-(4,3,2-de)(1,4)-benzothiazine is added portionwise and with stirring thereto. Stirring is continued and the temperature of the reaction mixture is raised to and maintained at from 80° C. to 100° C. for a period of 1.5 hours. After the heating period, the reaction mixture is cooled to room temperature and then poured into ice water, and the resulting mixture treated with kieselguhr and filtered to remove tarry substances. The filtrate is then adjusted to a pH of 5 by the addition of a saturated sodium acetate solution. During this addition, a solid precipitates and the mixture is allowed to stand after the treatment for about 30 minutes to permit coagulation of the suspended solid. This solid is then collected by filtration and recrystallized from ethanol to give the desired 2,3,5,6-tetrahydro-(1,4)-thiazino - (4,3,2-de)(1,4) - benzothiazine-9-carboxaldehyde product as orange needles melting at from 111–113° C. A second recrystallization from ethanol gives the product as orange crystals melting at from 112–113° C.

*Elemental analysis.*—Calculated for $C_{11}H_{11}NOS_2$ (percent): C, 55.67; H, 4.67; N, 5.89. Found (percent): C, 55.7; H, 4.64; N, 6.05.

EXAMPLE 2

Dimethylformamide (35 milliliters) is added to 7.2 grams (0.047 mole) of phosphorus oxychloride at a rate such that the temperature does not exceed 10° C. Thereafter, 10.0 grams (0.0448 mole) of 2,3,5,6-tetrahydro-8-methyl-(1,4)-thiazino - (4,3,2-de)(1,4) - benzothiazine is added portionwise with stirring and while maintaining the temperature of this mixture below 10° C. The stirring of the resulting mixture is continued for about one hour while maintaining the temperature at from 0° to 10° C. Thereafter, the mixture is warmed to room temperature and then heated at 85° C. to 90° C. for one hour. After cooling, the solution is poured into ice water and the resultant mixture neutralized to a pH of about 5 by the addition of a saturated solution of sodium acetate. An orange-red solid precipitates and is collected by filtration and dried. This dried solid is recrystallized twice from ethanol to give the desired 2,3,5,6-tetrahydro-8-methyl-(1,4)-thiazino - (4,3,2-de)(1,4) - benzothiazine - 9 - carboxaldehyde product as a deep orange-red solid melting at 114.5°–116.5° C.

*Elemental analysis.*—Calculated for $C_{12}H_{13}NOS_2$ (percent): C, 57.3; H, 5.2; N, 5.6. Found (percent): C, 57.6; H, 5.4; N, 5.7.

EXAMPLE 3

A solution of 5.0 grams (0.021 mole) of 2,3,5,6-tetrahydro- - (1,4) - thiazino-(4,3,2-de)(1,4)-benzothiazine-9-carboxaldehyde dissolved in 50 milliliters of glacial acetic acid is warmed to 60° C. with stirring. A solution of 2.4 grams of 30 percent hydrogen peroxide (0.021 mole $H_2O_2$) dissolved in 20 milliliters of glacial acetic acid is then added to this warmed solution in a dropwise fashion. This addition is carried out at a rate such that the temperature of the reaction mixture does not exceed 65° C. Thereafter the reaction mixture is stirred at 60° C. for six hours and then poured into ice water. The resultant solution is filtered and a brown solid is collected. This solid is stirred with methylene chloride and filtered to remove a small amount of insoluble material. The filtrate is dried over anhydrous magnesium sulfate and stripped of solvent leaving an orange solid melting at from 139°–143° C. The aqueous filtrate is neutralized with ammonium hydroxide during which period an orange solid precipitates. This solid is slurried in methylene chloride and the resultant solution filtered. The filtrate is dried over anhydrous magnesium sulfate and stripped of solvent giving an orange solid melting at 169°–170° C. The two crops are combined and recrystallized from a benzene-ethanol mixture to give the desired 2,3,5,6-tetrahydro - (1,4 - thiazino - (4,3,2-de)(1,4) - benzothiazine-9-carboxaldehyde 1-oxide product as orange needles melting at from 171.5°–172° C.

*Elemental analysis.*—Calculated for $C_{11}H_{11}NO_2S_2$ (percent): C, 52.15; H, 4.38; N, 5.53. Found (percent): C, 52.40; H, 4.23; N, 5.40.

EXAMPLE 4

2,3,5,6-tetrahydro - (1,4) - thiazino - (4,3,2-de)(1,4)-benzothiazine - 9 - carboxaldehyde (10.0 grams; 0.0421 mole) is dissolved in 100 milliliters of glacial acetic acid and this solution warmed to 60° C. To this warmed solution is added a solution of 9.5 grams of 30 percent hydrogen peroxide (0.084 mole) in 20 milliliters of glacial acetic acid. The peroxide solution is added dropwise and at a rate such that the temperature of the reaction mixture remains below 65° C. When the addition has been completed, the mixture is stirred at 60° C. for 16 hours. The reaction mixture is thereafter poured into ice water and the small amount of oily solid impurity removed by filtration. The aqueous filtrate is neutralized with ammonium hydroxide and then concentrated to about ½ of its original volume by evaporation. The concentrate is then extracted with chloroform, the extract dried over anhydrous magnesium sulfate and the solvent removed by evaporation. The residue is recrystallized from ethanol giving the desired 2,3,5,6-tetrahydro-(1,4)-thiazino-(4,3,2-de)(1,4)-benzothiazine - 9 - carboxaldehyde 1,7-dioxide product as a yellow-orange solid having a melting point of 234.5° C. (with decomposition).

*Elemental analysis.*—Calculated for $C_{11}H_{11}NO_3S_2$ (percent): C, 49.05; H, 4.12; N, 5.20. Found (percent): C, 48.8; H, 4.05; N, 5.07.

EXAMPLE 5

2,3,5,6-tetrahydro - (1,4) - thiazino-(4,3,2-de)(1,4)-benzothiazine-9-carboxaldehyde 1-oxide (5.3 grams; 0.022 mole) in 60 milliliters glacial acetic acid is warmed to 60° C. with stirring. A solution of 10.0 grams of 30 percent hydrogen peroxide in 40 milliliters of glacial acetic acid is added, dropwise, at such a rate that the temperature does not rise above 65° C. The reaction mixture is stirred at 60° C. for 16 hours. The dark mixture is then poured into ice water resulting in the precipitation of a tan solid. This by-product is isolated by filtration. The filtrate is concentrated in vacuo and the concentrate then extracted with several portions of methylene chloride. The extracts are combined and dried over anhydrous magnesium sulfate and upon concentration in vacuo give a yellow powder as residue. Two recrystallizations of the precipitate from acetone-petroleum ether (60°–70° C.) give the 2,3,5,6-tetrahydro - (1,4) - thiazino-(4,3,2-de)(1,4)-benzothiazine - 9 - carboxaldehyde 1,1,7-trioxide product as yellow crystals melting at 248° C. (with decomposition).

*Elemental analysis.*—Calculated for $C_{11}H_{11}NO_4S_2$ (percent): C, 46.30; H, 3.89; N, 4.91. Found (percent): C, 47.05; H, 3.98; N, 5.10.

EXAMPLE 6

Hydroxylamine hydrochloride (7.0 grams; 0.10 mole) is dispersed in a mixture of 50 milliliters of ethanol and 50 milliliters of pyridine to prepare a solution containing hydroxylamine. 2,3,5,6-tetrahydro - (1,4 - thiazino-(4,3,2-de)(1,4)-benzothiazine - 9 - carboxaldehyde (10.0 grams; 0.0422 mole) is then added to the resulting solution at room temperature with stirring. The resultant mixture is heated on the steam bath at the boiling point and under reflux for a period of 2 hours. Thereafter the solvents are removed by evaporation in vacuo and the solid residue is extracted with 50 milliliters of cold water and collected on a filter. The solid thus obtained is recrystallized twice from ethanol to obtain the desired 2,3,5,6-tetrahydro - (1,4) - thiazino(4,3,2-de)(1,4)-benzothiazine-9-carboxaldehyde oxime product as tan crystals having a melting point of 159° C.

*Elemental analysis.*—Calculated for $C_{11}H_{12}N_2OS_2$ (percent): C, 52.35; H, 4.79; N, 11.10. Found (percent): C, 52.2; H, 4.84; N, 11.3.

EXAMPLE 7

2,3,5,6 - tetrahydro - (1,4) - thiazino-(4,3,2-de)(1,4)-benzothiazine-9-carboxaldehyde (0.7 gram; 0.003 mole) is dispersed in 55 milliliters of 50 percent ethanol at room temperature. To the resultant solution is added 0.3 gram (0.003 mole) of thiosemicarbazide with stirring while maintaining the solution at room temperature. Thereafter, the resultant mixture is heated on the steam bath at from 80° to 90° C. for 1.5 hours while stirring is continued. The hot reaction mixture is filtered to obtain a bright yellow powder having a melting point of 231° C. (with decomposition). The filtrate is cooled, precipitating additional bright yellow powder having a melting point of 230° C. (with decomposition). The two crops are combined and represent the desired 2,3,5,6-tetrahydro-(1,4)-thiazino-(4,3,2-de)(1,4) - benzothiazine-9-carboxaldehyde thiosemicarbazone product.

*Elemental analysis.*—Calculated for $C_{12}H_{14}N_4S_3$ (percent): C, 46.42; H, 4.55; S, 30.98. Found (percent): C, 46.65; H, 4.57; S, 30.95.

EXAMPLE 8

Semicarbazide hydrochloride (0.885 gram; 0.00796 mole) and sodium acetate (0.65 gram; 0.0076 mole) are both dispersed in 70 milliliters of 50 percent methanol to prepare a solution containing semicarbazide. While stirring this solution, 2.0 grams (0.0080 mole) of 2,3,5,6-tetrahydro - 8 - methyl - (1,4)-thiazino-(4,3,2-de)(1,4)-benzothiazine-9-carboxaldehyde is added proportionwise thereto at room temperature. The resulting mixture is heated on the steam bath at from 80° to 90° C. while continuing the stirring for 2.5 hours. The hot reaction mixture is filtered and the filtered solid is recrystallized from an acetone-petroleum ether (60°–70° C.) mixture to give the desired 2,3,5,6 - tetrahydro-8-methyl-(1,4)-thiazino-(4,3,2-de)(1,4)-benzothiazine-9 - carboxaldehyde semicarbazone product as dull red crystals melting at 202°–203° C.

*Elemental analysis.*—Calculated for $C_{13}H_{16}N_4OS_2$ (percent): C, 50.62; H, 5.23; S, 20.79. Found (percent): C, 50.55; H, 5.14; S, 21.05.

EXAMPLE 9

2,3,5,6-tetrahydro-(1,4) - thiazino - (4,3,2 - de)(1,4)-benzothiazine-9-carboxaldehyde (7.2 grams; 0.030 mole) and phenylhydrazine (3.8 grams; 0.035 mole) are both dispersed in 165 milliliters of ethanol at room temperature and with stirring. The resultant mixture is heated at the boiling temperature under reflux and maintained thereat for 2 hours. The mixture is then allowed to cool to room temperature during which time crystallization begins. This crystallized solid is collected by filtration and is the desired 2,3,5,6 - tetrahydro - (1,4)-thiazino-(4,3,2-de)(1,4)-benzothiazine-9 - carboxaldehyde phenylhydrazone product as straw colored blades melting at 170°–171° C.

*Elemental analysis.*—Calculated for $C_{17}H_{17}N_3S_2$ (percent): C, 62.35; H, 5.23; N, 12.83. Found (percent): C, 62.6; H, 5.33; N, 12.5.

EXAMPLE 10

2,3,5,6 - tetrahydro - 8 - methyl - (1,4) - thiazino-(4,3,2-de)(1,4)-benzothiazine - 9 - carboxaldehyde (5.0 grams; 0.020 mole) is dispersed in 150 milliliters of hot ethanol. While maintaining the resultant solution under these temperature conditions, a solution of 3.0 grams (0.020 mole) of 4-nitrophenylhydrazine in 100 milliliters of hot ethanol is gradually added with stirring. The temperature of the mixture is then raised to the boiling temperature and maintained under reflux with stirring for 2 hours. During the heating period, deep maroon crystals form in the reaction mixture. After heating, the temperature of the mixture is allowed to return to room temperature and the reaction mixture thereafter filtered to give a dark maroon, crystalline solid, having a melting point of 229° C. (with decomposition). Recrystallization of this solid from chloroform gives the desired 2,3,5,6-tetrahydro - 8 - methyl - (1,4)-thiazino(4,3,2-de)(1,4)-benzothiazine-9-carboxaldehyde 4 - nitrophenylhydrazone product as maroon crystals having a melting point of 232° C. (with decomposition).

*Elemental analysis.*—Calculated for $C_{18}H_{18}N_4O_2S_2$ (percent): C, 55.94; H, 4.69; N, 14.50. Found (percent): C, 55.7; H, 4.67; N, 14.0.

In accordance with the method set forth herein, the following compounds are prepared:

2,3,5,6-tetrahydro - 8 - ethyl-(1,4)-thiazino-(4,3,2-de)-(1,4)-benzothiazine-9-carboxaldehyde (molecular weight 265.4) from 2,3,5,6 - tetrahydro - 8-ethyl-(1,4)-thiazino-(4,3,2-de)(1,4)-benzothiazine.

2,3,5,6 - tetrahydro - 8 - ethyl - (1,4) - thiazino-(4,3,2-de)(1,4)-benzothiazine-9 - carboxaldehyde 1-oxide and 2,3,5,6-tetrahydro-8-ethyl-(1,4)-thiazino - (4,3,2-de)-(1,4)-benzothiazine-9-carboxaldehyde 7-oxide (molecular weights 281.4) by oxidizing 2,3,5,6-tetrahydro-8-ethyl-(1,4)-thiazino-(4,3,2-de)(1,4) - benzothiazine - 9-carboxaldehyde.

2,3,5,6 - tetrahydro - 8 - ethyl - (1,4) - thiazino-(4,3,2-de)(1,4) - benzothiazine - 9-carboxaldehyde 1,1,7-trioxide and 2,3,5,6-tetrahydro-8-ethyl-(1,4) - thiazino-(4,3,2-de)(1,4) - benzothiazine-9-carboxaldehyde 1,7,7,-trioxide (molecular weights 313.4) by oxidizing 2,3,5,6-tetrahydro-8-ethyl-(1,4)-thiazino-(4,3,2-de)(1,4) - benzothiazine-9-carboxaldehyde.

2,3,5,6 - tetrahydro - 8 - (n-propyl)-(1,4) - thiazino-(4,3,2-de)(1,4)-benzothiazine-9 - carboxaldehyde (molecular weight 279.4) from 2,3,5,6-tetrahydro-8-(n-propyl)-(1,4)-thiazino-(4,3,2-de)(1,4)-benzothiazine.

2,3,5,6 - tetrahydro - 8 - (n-butyl) - (1,4)-thiazino-(4,3,2-de)(1,4) - benzothiazine-9-carboxaldehyde (molecular weight 293.4) from 2,3,5,6-tetrahydro-8-(n-butyl)-(1,4)-thiazino-(4,3,2-de)(1,4)-benzothiazine.

2,3,5,6 - tetrahydro - 8 - (n - propyl) - (1,4 - thiazino-(4,3,2 - de)(1,4 - benzothiazine - 9 - carboxaldehyde 1,7-dioxide (molecular weight 311.41) by oxidizing 2,3,5,6-tetrahyrro - 8 - (n - propyl) - (1,4) - thiazino - (4,3,2-de)(1,4)-benzothiazine-9-carboxaldehyde.

2,3,5,6 - tetrahydro - 8 - ethyl - (1,4) - thiazino - (4,3,2-de)(1,4-benzothiazine-9-carboxaldehyde oxime (molecular weight 280.4) by treating 2,3,5,6-tetrahydro-8-ethyl-(1,4) - thiazino - (4,3,2 - de)(1,4) - benzothiazine - 9-carboxaldehyde with hydroxylamine hydrochloride.

2,3,5,6 - tetrahydro - (1,4) - thiazino - (4,3,2 - de)(1,4) - benzothiazine - 9 - carboxaldehyde semicarbazone as shiny light orange crystals having a melting point of 288° C. (with decomposition).

*Elemental analysis.*—Calculated for $C_{12}H_{14}N_4OS_2$ (percent): C, 48.96; H, 4.79; N, 19.02. Found (percent): C, 48.80; H, 4.73; N, 18.70 by treating 2,3,5,6-tetrahydro - (1,4) - thiazino - (4,3,2 - de)(1,4) - benzothiazine-9-carboxaldehyde with semicarbazide hydrochloride.

2,3,5,6 - tetrahydro - 8 - methyl - 1,4) - thiazino - (4,3,2 - de)(1,4) - benzothiazine - 9 - carboxaldehyde thiosemicarbazone as an orange-yellow powder having a melting point of 230° C. (with decomposition).

*Elemental analysis.*—Calculated for $C_{13}H_{16}N_4S_3$ (percent): C, 48.12; H, 4.97; N, 17.27; S, 29.64. Found (percent): C, 48.10; H, 4.98; N, 17.30; S, 29.35 by treating 2,3,5,6 - tetrahydro - 8 - methyl - (1,4) - thiazino - (4,3,2-de)(1,4) - benzothiazine - 9 - carboxaldehyde with thiosemicarbazide.

2,3,5,6 - tetrahydro - 8 - (n - propyl) - (1,4) - thiazino-(4,3,2 - de)(1,4) - benzothiazine - 9 - carboxaldehyde 4-semicarbazone (molecular weight 336.5) by treating 2,3,5,6 - tetrahydro - 8 - (n - propyl) - (1,4)-thiazino-(4,3,2-de)(1,4)-benzothiazine-9-carboxaldehyde with semicarbazide.

2,3,5,6 - tetrahydro - 8 - (n - butyl) - (1,4) - thiazino (4,3,2 - de)(1,4 - benzothiazine - 9 - carboxaldehyde 4-nitrophenylhydrazone (molecular weight 428.6) by treating 2,3,5,6 - tetrahydro - 8 - (n - butyl) - (1,4) - thiazino - (4,3,2 - de) - (1,4) - benzothiazine - 9 - carboxaldehyde with 4-nitrophenylhydrazine.

2,3,5,6 - tetrahyrro - 8 - ethyl - (1,4) - thiazino - (4,3,2-de)(1,4)-benzothiazine-9-carboxaldehyde with 2,4-dinitrophenylhydrazone (molecular weight 445.5) by treating 2,3,5,6 - tetrahydro - 8 - ethyl - (1,4) - thiazino - (4,3,2-de)(1,4)-benzothiazine-9-carboxaldehyde with 2,4-dinitrophenylhydrazine.

The compounds of the present invention are useful as pesticides for the control of a number of bacteria, fungi, insect and internal parasite pests such as arachnids, beetles, ticks, flies, hookworms, screwworms, cattle grubs, and the causative agents of potato blight and apple scab. For such uses the unmodified compounds can be employed. The compounds can also be dispersed on a finely divided solid and employed as a dust. Also, such mixtures can be dispersed in water with or without the aid of a surface active dispersing agent and the resulting aqueous suspension employed as a spray, drench, or wash. In other procedures, the compounds are employed as toxic constituents in solvent solutions, oil-in-water or water-in-oil emulsions, or aqueous dispersions. Good results are obtained with methods employing and compositions containing pesticidal amounts of the novel compounds. These amounts can range, generally, from 50 to 10,000 parts of the compound or mixtures thereof per million parts by weight.

As representative operations, 2,3,5,6-tetrahydro-(1,4)-thiazino - (4,3,2 - de)(1,4) - benzothiazine - 9 - carboxaldehyde gives substantially complete controls and kills of mouse tapeworm when incorporated in the rations of such infested animals, as the sole toxicant, at concentrations of 0.10 percent by weight.

In further representative operations, 2,3,5,6-tetrahydro-(1,4) - thiazino - (4,3,2 - de)(1,4) - benzothiazine - 9-carboxaldehyde and 2,3,5,6 - tetrahydro-8-methyl-(1,4)-thiazino-(4,3,2 - de)(1,4) - benzothiazine - 9 - carboxaldehyde semicarbazone give substantially complete controls and kills of *Trichphyton mentagrophytes*, when each are separately employed as the sole toxicant in aqueous compositions at concentrations of 1000 parts per million by weight.

In still further operations, 2,3,5,6-tetrahydro-(1,4)-thiazino - (4,3,2 - de)(1,4) - benzothiazine - 9 - carboxaldehyde thiosemicarbazone gives substantially complete controls and kills of the causative agent of downey mildew when it is applied thereto as the sole toxicant in aqueous compositions at a concentration of 1000 parts per million by weight.

In additional operations, 2,3,5,6 - tetrahydro - 8 - methyl - (1,4) - thiazino - (4,3,2-de)(1,4)-benzothiazine-9-carboxaldehyde semicarbazone and 2,3,5,6 - tetrahydro-8 - methyl - (1,4) - thiazino - (4,3,2-de)(1,4)-benzothiazine-9-carboxaldehyde thiosemicarbazone give an inhibition in the growth of *Mycobacterium phlei* when each is separatetly applied to an agar support of such organisms as the sole toxicant in aqueous composition containing 500 and 1000 parts per million by weight, respectively.

Further, 2,3,5,6 - tetrahydro - (1,4) - benzothiazine-9-carboxaldehyde oxime gives 100 percent controls and kills of the yellow fever mosquito when the latter is contacted with an aqueous composition containing five parts of the compounds per million parts by weight.

The thiazinobenzothiazines employed as the starting compounds in accordance with the teachings of the present invention are prepared by dissolving an N,N-bis(2-(substituted sulfonylthio)ethyl)aniline compound which corresponds to the formula

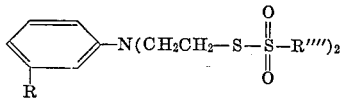

in which R'''' represents lower alkyl, phenyl, or substituted phenyl in a polar organic solvent and thereafter heating the resulting solution at a temperature ranging from about 60° C. to about 130° C., preferably 70° to 100° C., to effect ring closure. In carrying out this method, the aniline compound is dispersed in a polar organic liquid such as ethanol or sulfolane and the reaction mixture thus formed is heated at a temperature within the cited temperature range for at least 1 hour and generally until the desired product mixture, as measured by convenient analytical techniques, is obtained. Following the heating period, the reaction mixture is cooled to terminate the reaction. The desired product is then separated and recovered by such conventional techniques as filtration, decantation, extraction, chromatography, and the like.

The N,N - bis(2 - (substituted sulfonylthio)ethyl)-aniline compounds are prepared by reacting a dihalo compound of the formula

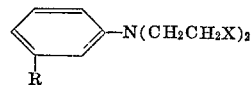

wherein X represents bromo or chloro with an alkali metal salt of a thiosulfonic acid of the formula

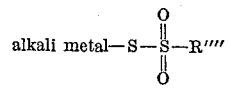

R'''' being as above defined, in an organic reaction medium at temperatures of from 60° C. to 120° C. Following the reaction, the reaction mixture is filtered hot and the filtrate cooled to initiate precipitation of product which is recovered by centrifugation, decantation, or filtration.

Preferably, the thiazinobenzothiazine starting compounds are prepared directly from the N,N-bis(2-haloethyl)aniline compounds, the N,N-bis(2-(substituted sulfonylthio)ethyl)aniline intermediates being formed in situ.

What is claimed is:
1. The compound corresponding to one of the formulas

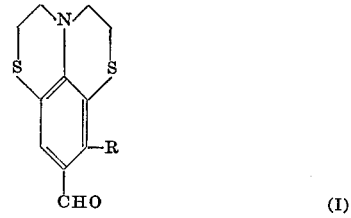

(I)

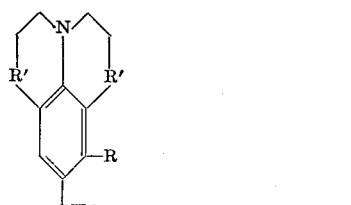

(II)

and

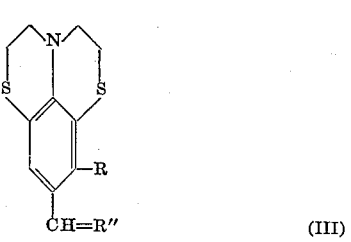

(III)

wherein each R represents hydrogen or lower alkyl; one R' represents a sulfinyl (SO) group and the other R' represents a sulfur atom, a sulfinyl (SO) group, or a sulfonyl (SO$_2$) group; R'' represents hydroxyimino (=NOH), semicarbazono (=NNHCONH$_2$), thiosemicarbazono (=NNHCSNH$_2$), or hydrazono (=NNHR''')

in which R''' represents hydrogen, phenyl, nitrophenyl or dinitrophenyl.

2. The compound claimed in claim 1 which is 2,3,5,6-tetrahydro - (1,4) - thiazino - (4,3,2-de)(1,4)-benzothiazine-9-carboxaldehyde.

3. The compound claimed in claim 1 which is of Formula II.

4. The compound claimed in claim 3 which is 2,3,5,6-tetrahydro - (1,4) - thiazino - (4,3,2-de)(1,4)-benzothiazine-9-carboxaldehyde 1-oxide.

5. The compound claimed in claim 1 which is of Formula III and in which R'' is hydroxyimino.

6. The compound claimed in claim 5 which is 2,3,5,6-tetrahydro - (1,4) - thiazino - (4,3,2-de)(1,4) - benzothiazine-9-carboxaldehyde oxime.

7. The compound claimed in claim 1 which is of Formula III and in which R'' is semicarbazono.

8. The compound claimed in claim 7 which is 2,3,5,6-tetrahydro - 8 - methyl - (1,4)-thiazino-(4,3,2-de)(1,4)-benzothiazine-9-carboxaldehyde semicarbazone.

9. The compound claimed in claim 1 which is of Formula III and in which R'' is thiosemicarbazono.

10. The compound claimed in claim 9 which is 2,3,5,6-tetrahydro - (1,4) - thiazino - (4,3,2-de)(1,4) - benzothiazine-9-carboxaldehyde thiosemicarbazone.

11. The compound claimed in claim 9 which is 2,3,5,6-tetrahydro - 8 - methyl - (1,4) - thiazino-(4,3,2-de)(1,4)-benzothiazine-9-carboxaldehyde thiosemicarbazone.

12. The compound claimed in claim 1 which is of Formula III and in which R'' is hydrazono.

13. The compound claimed in claim 12 which is 2,3,5,6 - tetrahydro - (1,4 - thiazino - (4,3,2-de)(1,4)-benzothiazine-9-carboxaldehyde phenylhydrazone.

14. The compound claimed in claim 12 which is 2,3,5,6 - tetrahydro - 8 - methyl - (1,4)-thiazino-(4,3,2-de)(1,4) - benzothiazine - 9 - carboxaldehyde 4-nitrophenylhydrazone.

References Cited
UNITED STATES PATENTS

| | | | |
|---|---|---|---|
| 2,947,744 | 8/1960 | Lowrie | 260—243 |
| 3,042,671 | 7/1962 | Lombardino et al. | 260—243 |
| 3,148,188 | 9/1964 | Hoya | 260—243 |

HENRY R. JILES, Primary Examiner

J. M. FORD, Assistant Examiner

U.S. Cl. X.R.

260—243, 577; 424—246